M. Hey,
Compressing Air.
No. 102,397.   Patented Apr. 26, 1870.

Witnesses:        Michael Hey

United States Patent Office.

MICHAEL HEY, OF PHILADELPHIA, PENNSYLVANIA.

*Letters Patent No. 102,397, dated April 26, 1870.*

IMPROVEMENT IN HYDRAULIC AIR-COMPRESSING APPARATUS

The Schedule referred to in these Letters Patent and making part of the same.

*To all whom it may concern:*

Be it known that I, MICHAEL HEY, of the city of Philadelphia, in the State of Pennsylvania, have invented a new and useful "Air-Compressing Apparatus;" and I do hereby declare that the following is a full, clear, and exact description of the construction and operation of the same, reference being had to the accompanying drawings making a part of this specification, in which—

Figure 1:
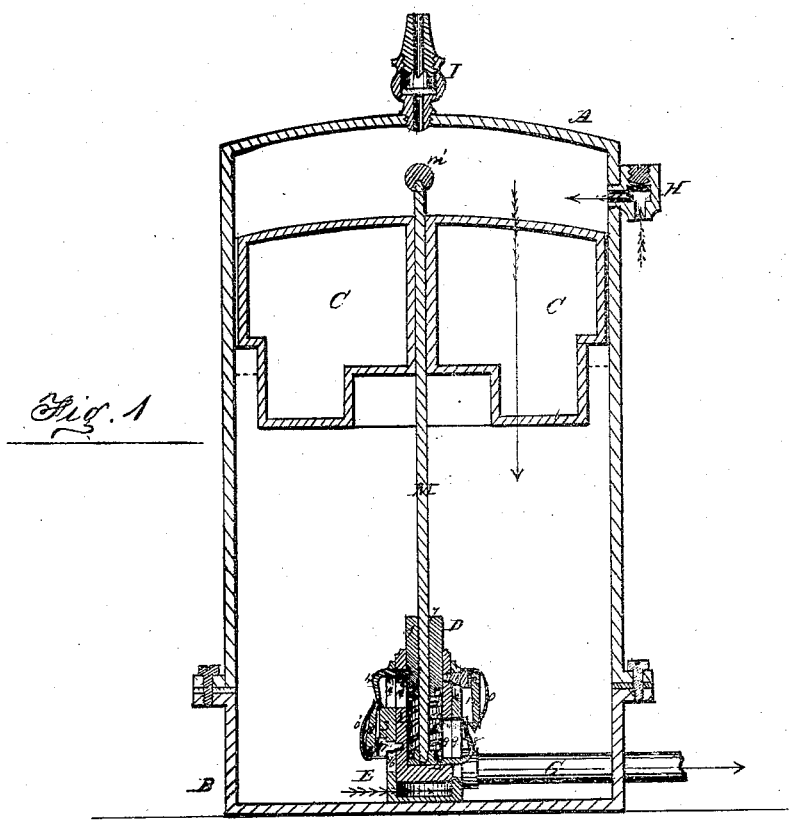

Figure 1 is a vertical central section of the said apparatus, and

Figure 2:
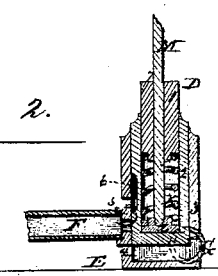

Figure 2, a like section, at a right angle to that of fig. 1, of the water inlet and outlet device detached.

Like letters and numbers of reference indicating the same parts when in both figures.

The nature of my invention consists of a float in connection with an inlet and outlet water-valve device, within a capacious air and water vessel provided with corresponding inlet and outlet water-pipes, and inlet and outlet air-valves, whereby, when put in communication with a hydrant, or other water-supply under pressure, the said apparatus will continue to operate automatically in forcing air into, and compressing it within any capacious reservoir in communication with a beer or oil cask, or any other vessel from which a fluid is desired to be elevated and withdrawn, as occasion may require.

Referring to the drawings—

A B is the air and water vessel;

C, the float;

D E, the water-valve device;

F and G, the inlet and outlet water-pipes; and

H and I, the inlet and outlet air-valves.

The vessel A B is made of sheet metal, and in two parts, divided horizontally, and bolted together so as to afford access to the interior, and form an air-tight vessel of any required capacity.

The inlet air-valve H in the side of the said vessel, and the air outlet-valve I in the top, are simple disk-valves operated by the alternate pressure of the air and gravitation.

The water-valve device D E consists of three metallic cylinders, 1 2 3.

Cylinder 3 is hollow, open at its upper end, and closed at its lower end; and through one side of cylinder 3 there is a horizontal slot, 4, (see fig. 2,) which gives open communication with its interior, and with the outlet-pipe G, which extends out through the side of the vessel A B, as a waste-water outlet.

Immediately above the slot 4 the inlet water-pipe F opens into the cylinder 3.

This pipe F extends through one side of the vessel A B, and is intended to be put in communication with the supply-pipe from the hydrant, or other positive water supply; and immediately above the said pipe F there is another horizontal slot, 5, through the one side of cylinder 3.

The cylinder 2 is also hollow, closed at its lower end, and open at its upper end, and is fitted so that it may be slid accurately up and down within cylinder 3. It has a recess, 6, in one side, which, when the said cylinder 2 rests with its lower end on the bottom of cylinder 3, and thus closes the slot 4 of the latter, is brought directly opposite to the open end of the inlet-pipe F, and thus affords an open way between the open end of the pipe F and the slot 5; but, when the said cylinder 2 is raised enough to fully open the slot 4, it, at the same time, closes the slot 5, as shown in the same figure.

The cylinder 1 fits so that it will slide accurately in cylinder 2, and has a hole, 7, bored longitudinally through its center.

It is about half the length of cylinder 2, and rests upon a coil spring, K, which latter rests upon a disk, L, which is fixed to the lower end of a rod, M, so that it can be slid easily up and down in the hole 7 of cylinder 1, and, when down, the said disk L rests upon the bottom of cylinder 2.

The disk L has a hook, 8, (see fig. 1,) which projects through a vertical slot, 9, in the same side of each of the two cylinders 2 and 3, so that the said hook can be moved up and down therein by a corresponding motion given to the rod M.

In the same side of cylinder 3, and near its upper end, there is a vertical slot, 10, in which slides a projecting stud, 11, which is screwed fast into the same side of cylinder 2, and to this stud is articulated a catch-hook, 12, compressed by a spring, O, and so arranged as to catch under a projection on the outside of cylinder 3 when cylinder 2 rests down on the bottom of cylinder 3, and so also that, as the hooked disk L is drawn upward by means of the rod M, the hook 8 will underrun the catch-hook 12, and detach it from the projection on cylinder 3, and thus allow the cylinder 2 to be suddenly forced upward by the reaction of the coiled spring K, and thus simultaneously close the mouth of the water inlet-pipe F and open the water-outlet slot 4.

Near the upper end of the opposite side of each of the cylinders 2 and 3 there is a slot, 14, in which passes freely a hook, 15, which is screwed fast into cylinder 1; and on the same side of cylinder 3, and about in the same horizontal plane with the inlet-pipe F, there is a vertical slot, 16, in which slides a projecting stud, 17, which is screwed fast into cylinder 2, and has articulated to its outer end a catch-hook, 18, compressed by a spring, O', which, when cylinder 2 has been suddenly forced up by the reaction of the coil spring K, catches on a projection on the outside of cylinder 3, and holds the said cylinder 2 up, thus simultaneously keeping open the water-outlet slot 4, and closing the water inlet-pipe F; but, when the cylinder 1 is pressed downward, the hook 15 underruns the catch-hook 18, detaches it, and allows the compressed coil spring K, by its reaction, to suddenly and simultaneously close the water-outlet slot 4, and open the mouth of the water inlet-pipe F.

The movements of the rod M are produced by the combined action of the water and the float C in the vessel A B, as follows, viz:

The pipe F being put in communication with a hydrant, or other water-supply under pressure, the water is forced into the vessel A B, and the float C resting upon the cylinder 1, and by its weight, compressing the coil spring K, and holding down the said cylinder 1, and thus keeping the outlet-slot 4 closed, the entering water passes from the pipe F through the recess 6 and slot 5 and buoys the float C, which, gradually rising, forces the air in the said vessel out through the valve I into the intended receiver or compressed-air reservoir; and when the float reaches the knob m' of the rod M it draws the said rod, with its disk L, upward, compressing the coil spring K, and, at the same time, causing the hook 8 to underrun and detach the catch hook 12, when instantly the reaction of the said coil spring K forces the cylinder 2 upward, and thus causes it to simultaneously open the water-outlet slot 4, and close the water-inlet pipe F. The float C now gradually descends as the water escapes through the waste-pipe G, the valve I instantly closing, and therefore preventing a return of air from the air-pressure reservoir, and the valve H opening and letting a fresh supply of air into the vessel, (all as indicated by the arrows in fig. 1,) and the float C continuing to descend, eventually presses the cylinder 1 downward, compressing the coil spring K, and causing the hook 15 to underrun and detach the catch-hook 18, when the reaction of the coil spring instantly forces the cylinder 2 downward, and thus causes it to simultaneously close the water-outlet slot 4, and open the water inlet-pipe F, and thus the apparatus continues to operate automatically in keeping up any required amount of pressure in the air-pressure reservoir.

Having thus fully described my invention,

What I claim as new, and desire to secure by Letters Patent, is confined to the following, viz—

1. In combination with any suitable vessel A B for receiving and discharging water and air or other fluids, the mechanical device D E, consisting of the cylinders 1, 2, and 3, spring K, rod M, with its disk L and hook 8, the hook 15, catch-hooks 12 and 18, the inlets F and 5, and the outlet-slot 4; the said parts of the device being constructed and arranged to operate together, substantially in the manner described, for the purpose of suddenly or quickly opening and closing the water-inlet and outlet-valves, as described.

2. In combination with the said mechanical device D E, and its containing vessel A B, a float, C, arranged to operate upon the said device D E, substantially in the manner and for the purpose set forth and described.

MICHAEL HEY.

Witnesses:
BENJ. MORISON,
WM. H. MORISON,
W. W. DOUGHERTY.